United States Patent
Lin et al.

(10) Patent No.: US 9,049,355 B2
(45) Date of Patent: Jun. 2, 2015

(54) METHODS FOR IMAGE PROCESSING OF FACE REGIONS AND ELECTRONIC DEVICES USING THE SAME

(71) Applicant: HTC Corporation, Taoyuan, Taoyuan County (TW)

(72) Inventors: Ching-Fu Lin, Taoyuan (TW); Pol-Lin Tai, Taoyuan (TW); Huai-Che Lee, Taoyuan (TW); Jing-Lung Wu, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 25 days.

(21) Appl. No.: 13/974,912

(22) Filed: Aug. 23, 2013

(65) Prior Publication Data

US 2014/0085514 A1 Mar. 27, 2014

Related U.S. Application Data

(60) Provisional application No. 61/704,247, filed on Sep. 21, 2012.

(51) Int. Cl.
*H04N 5/228* (2006.01)
*H04N 5/217* (2011.01)
*H04N 5/262* (2006.01)

(52) U.S. Cl.
CPC ............. *H04N 5/217* (2013.01); *H04N 5/2628* (2013.01)

(58) Field of Classification Search
None
See application file for complete search history.

(56) References Cited

U.S. PATENT DOCUMENTS

| | | | |
|---|---|---|---|
| 2006/0133654 A1* | 6/2006 | Nakanishi et al. | 382/118 |
| 2008/0080739 A1* | 4/2008 | Muramatsu | 382/103 |
| 2008/0174795 A1* | 7/2008 | Andres Del Valle | 358/1.9 |
| 2009/0060384 A1* | 3/2009 | Hayaishi | 382/282 |
| 2009/0226095 A1* | 9/2009 | Usui | 382/195 |
| 2009/0263022 A1* | 10/2009 | Petrescu et al. | 382/195 |
| 2010/0039536 A1* | 2/2010 | Dahllof et al. | 348/240.99 |
| 2010/0054620 A1* | 3/2010 | Kobayashi | 382/256 |
| 2011/0141219 A1* | 6/2011 | Yeh | 348/14.02 |
| 2012/0013783 A1* | 1/2012 | Asami | 348/333.02 |
| 2012/0092516 A1* | 4/2012 | Hata | 348/222.1 |
| 2012/0188386 A1* | 7/2012 | Kulkarni et al. | 348/208.11 |
| 2013/0039599 A1* | 2/2013 | Aoki et al. | 382/276 |
| 2013/0223698 A1* | 8/2013 | Corcoran et al. | 382/118 |

FOREIGN PATENT DOCUMENTS

WO WO 2011135977 A1 * 11/2011

* cited by examiner

*Primary Examiner* — Twyler Haskins
*Assistant Examiner* — Wesley J Chiu
(74) *Attorney, Agent, or Firm* — Birch, Stewart, Kolasch & Birch, LLP

(57) ABSTRACT

An embodiment of the invention discloses a face-slimming method applied to a series of images captured by an electronic device. The process begins to receive a current image from the series of captured images and detects at least one face landmark corresponding to a face region of the current image. The face landmark of the current image is compared with a reference landmark and a distortion mask is adjusted accordingly. And then, a size of the face region within the current image is then adjusted according to the distortion mask, where the distortion mask corresponds to positions of the face landmark.

13 Claims, 9 Drawing Sheets

METHODS FOR IMAGE PROCESSING OF FACE REGIONS AND ELECTRONIC DEVICES USING THE SAME

CROSS REFERENCE TO RELATED APPLICATIONS

This application claims the benefit of U.S. Provisional Application No. 61/704,247 filed on Sep. 21, 2012, the entirety of which is incorporated by reference herein.

BACKGROUND

1. Technical Field

The present invention relates to an electronic device and a method thereof for adjusting facial regions within images, and in particular it relates to an electronic device and a method thereof for reducing or eliminating perspective distortion within the facial regions according to a distortion mask.

2. Description of the Related Art

Wide-angle cameras are widely used to increase the field of view with a smaller focal lens, and also reduce the thickness of the lens. Therefore, wide-angle cameras are becoming widely used as mobile-telephone cameras. However, wide-angle cameras can easily cause perspective distortion because of the short focal lengths when capturing nearby 3D objects. This phenomenon frequently occurs in video chat applications, in which the faces of the users are usually close to the cameras during video chats, making the faces of the users appear bigger (wider) than they would in longer-distance shoots. It is desirable to have a method to reduce or eliminate the perspective distortion, resulting from close-distance shots by a wide-angle camera. In addition, from the perspective of modern aesthetic tastes, thinner faces are regarded as being more beautiful. Additionally, the invention presents a face-slimming method for generating images with thinner faces in order to make the faces displayed look more beautiful.

BRIEF SUMMARY

An embodiment of the invention discloses a face-slimming method applied to a series of images, which are captured by an electronic device. The process begins to receive a current image from the series of captured images and detects at least one face landmark corresponding to a face region of the current image. The face landmark of the current image is compared with a landmark reference and a distortion mask is adjusted accordingly. And then, the size of the face region within the current image is adjusted according to the distortion mask, where the distortion mask corresponds to positions of the face landmark.

An embodiment of the invention discloses an electronic device, comprising a camera module, an image processing module and an image output module. The camera module is configured to capture a series of images comprising a face of a user. The image processing module is configured to receive the series of images and, for each incoming current image, determine at least one face landmark of the face region within the current image, compare the face landmark with a landmark reference and adjust a size of the face region accordingly. The image output module is configured to transmit the series of adjusted images.

An image-processing method for use in an electronic device is introduced according to an embodiment of the invention. A series of images are captured and a face region of a user is detected from each of the images. A distortion mask corresponding to the face region is defined. A size of the face region of each image within the distortion mask is adjusted, and then the adjusted images are encoded into a video stream.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

Figure 1:
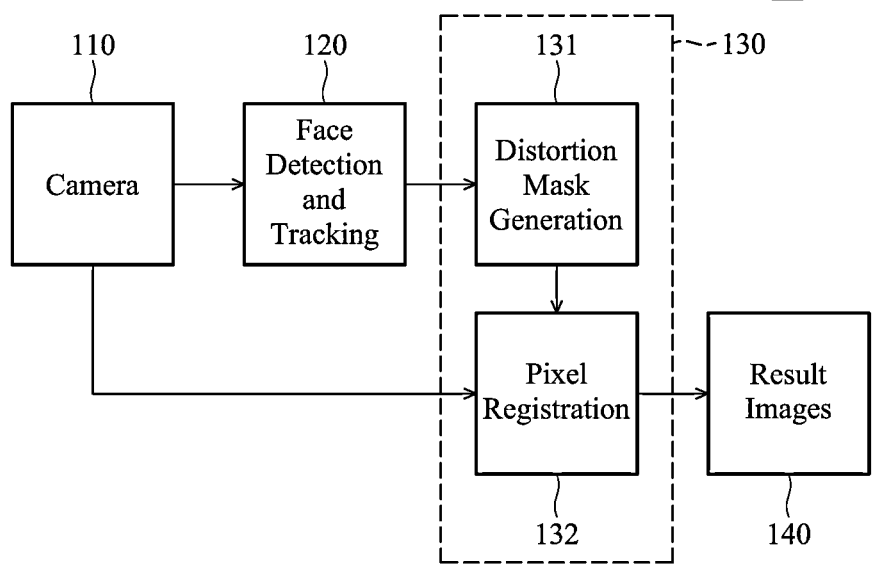
FIG. 1 illustrates the system blocks of an apparatus for generating video frames with reduced or eliminated perspective distortion according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 illustrates the system blocks of an apparatus for generating video frames with reduced or eliminated perspective distortion according to an embodiment of the invention. The apparatus 10 may implement face processing methods and comprise at least two main modules, such as a face detection and tracking module 120 and a distortion reduction module 130. The face detection and tracking module 120 analyzes images in the frame buffers, which are captured by a camera module 110, tracks how many faces are presented in the images and face landmarks, such as a roll angle, a left cheek position, a right cheek position, a philtrum position, a chin position, a length between two positions, or other parameters, for each face and outputs to the distortion module 130. The camera module 110 may comprise an image sensor, such as a CMOS (complementary metal-oxide-semiconductor) or CCD (charge-coupled device) sensor, to detect an image in the form of red, green and blue color strengths, and readout electronic circuits for collecting the sensed data from the image sensor. The face detection and tracking module 120 and the distortion reduction module 130 may be started upon a real-time video communication application is initiated, wherein the real-time video communication application captures a face in front of the camera module 110 and transmits the captured images to a peer device for display during a conversation, such as a remote notebook computer, a remote mobile phone, or others.

The distortion reduction module 130 may comprise a distortion mask generation module 131 and a pixel registration module 132. The distortion mask generation module 131 may define a distortion mask according to the received information from the face detection and tracking module 120. The pixel registration module 132 may utilize algorithms to adjust image pixels within the defined distortion mask to reduce or eliminate the perspective distortion and output result images 140. The above-described modules 110, 120, 130, 131 and 132 may be incorporated in an enclosure to form an electronic device, such as a notebook computer, a mobile phone, or others. The above-described modules 120, 130, 131 and 132 can be implemented in any of numerous ways. For example, they may be implemented using hardware, software or a combination thereof. It should be appreciated that any component or collection of components that perform the functions described above/hereinafter can be generically considered as one or more controllers that control the above/ hereinafter discussed function. The controller(s) can be implemented in numerous ways, such as with dedicated hardware, or with general-purpose hardware (e.g., one or more processors) that is programmed using microcode or software to perform the functions recited above/hereinafter. The face detection and tracking module 120 and the distortion reduction module 130 may be collectively referred to as an image processing module.

Figure 2:
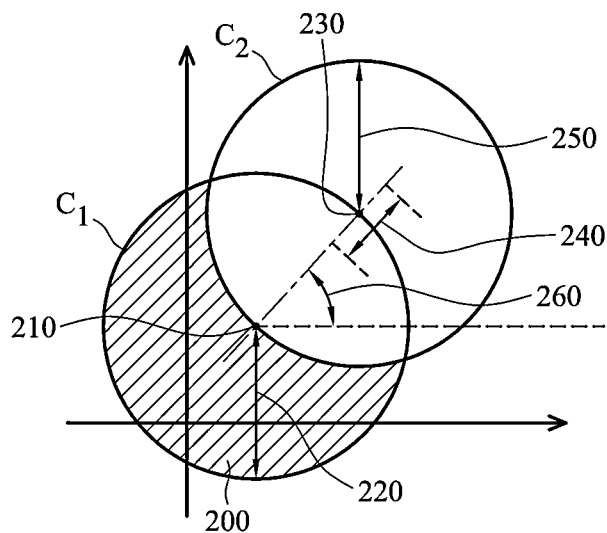
FIG. 2 is a schematic diagram illustrating the generation of a distortion mask.
Figure 3:
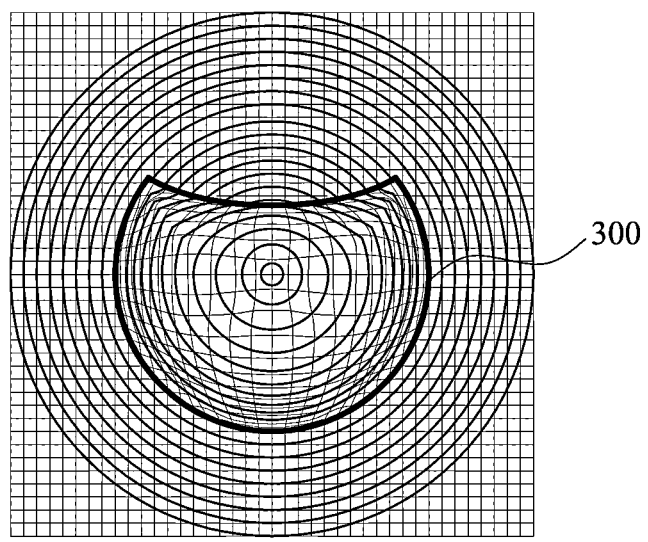
FIG. 3 is a schematic diagram illustrating perspective distortion within a distortion mask.
Figure 4:
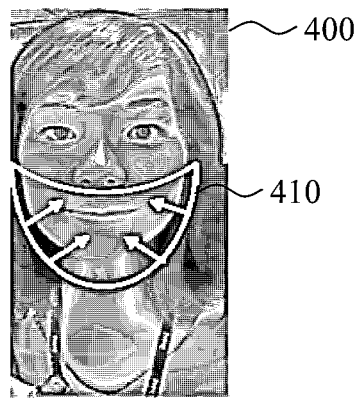
FIG. 4 illustrates the resulting distortion mask.
Figure 5:
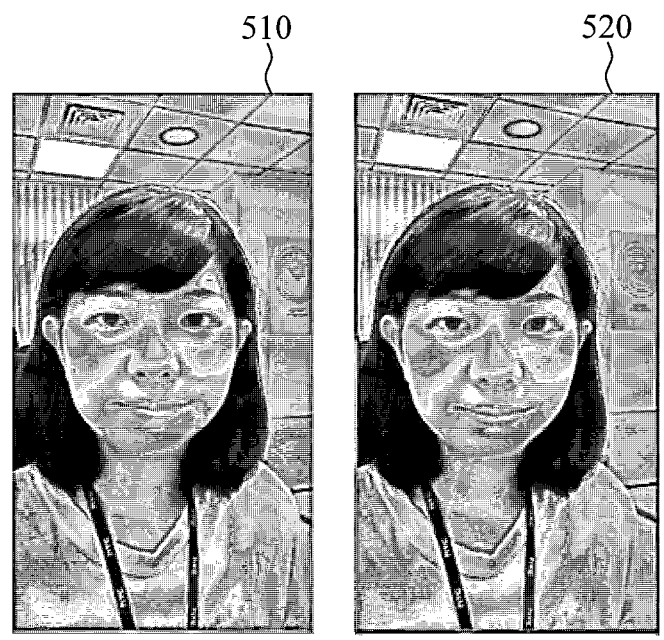
FIG. 5 illustrates exemplary images with/without the adjustments.

FIG. 2 is a schematic diagram illustrating the generation of a distortion mask. The distortion mask module 131 may receive information regarding face landmarks of one face from the face detection and tracking module 120 and generate a crescent-shaped mask 200 of FIG. 2 or 300 of FIG. 3 accordingly. The center 210 of the distortion mask 200 may be determined as a philtrum position received from the face detection and tracking module 120, while the radius 200 of the distortion mask 200 may be determined according to the received length between the philtrum position and left cheek position, or the received length between the philtrum position and right cheek position, or an average of the above two lengths, representing strengths of pincushion distortion. For example, the radius 200 of the distortion mask 200 may be the length between the philtrum position and the left/right cheek position plus a predetermined length, the maximum of the lengths between the philtrum position and the left cheek position, and the philtrum position and the right cheek position plus a predetermined length, or others. FIG. 3 is a schematic diagram illustrating perspective distortion within a distortion mask. FIG. 4 illustrates the resulting distortion mask 410 of an image 400 captured by the camera module 110. It can be observed that the distortion mask 410 covers a face area being roughly below the philtrum and cheeks. Finally, the pixel registration module 132 scans each pixel within the distortion mask 410, determines, for each pixel, a target pixel having a longer distance from the center of the distortion mask 410 than that to the pixel, and adjusts the color value of the pixel according to the color value of the determined target pixel. The described operations may be referred to as a face-slimming method. FIG. 5 illustrates exemplary images with/ without the adjustments by the pixel registration module 132, respectively. The left image 510 is the original image captured by the camera module 110 while the right image 520 is processed using the face slimming method by the pixel registration module 132. That is, as can be seen in FIG. 5, the size of the face region within current image, which is covered by the distortion mask 410, is adjusted to be smaller than the un-adjusted one, resulting in the face looking slimmer. Please note that the invention is not limited to application in the aforementioned face slimmer, and other types of face morphing may also be achieved by the introduced system with the use of face masking according to an embodiment of the invention.

Hereinafter, an algorithm utilized in the pixel registration module 132 is described with reference to FIG. 2 for generating the distortion mask. Input parameters are described as follows;

Effect Controller $\alpha$ (Control Main Circle $C_1$)
$\alpha_1$ Circle Center Coordinate
$\alpha_2$ Distortion Level
$\alpha_3$ Distortion Radius
Angle Controller $\beta$ (Control Concave Circle $C_2$)
$\beta_1$ Concave Angle with respect to image x plane
$\beta_2$ Radical distance shifter for the concave circle center
$\beta_3$ Radius Scalar The control main circle $C_1$ is the lower-left one as shown in FIG. 2 while the control concave circle $C_2$ is the upper-right one as shown in FIG. 2. The circle center coordinate $\alpha_1$ may be a philtrum position recognized by the face detection and tracking module 120 and can be observed by 210 of FIG. 2. Distortion Radius $\alpha_3$ is a predefined constant.

The distortion level $\alpha_2$ is defined as:

$$\alpha_2 = \text{typeweight}(1.1 + 0.1(\text{level}))\alpha_3^{0.3} \tag{1}$$

Here, the variable "typeweight" is set to 0.5 when the target face is determined as a thin face by the face detection and tracking module 120, otherwise, set to 1.0. Other values of the typeweight may be set according to the initial size of the detected face region in some embodiments of the invention. The variable "level" is predefined ranging from 0 to 10.

$\beta_2$ is predefined ranging from 0 to 1, for example, 0.55, representing the radical distance shifter 240 for the concave circle center 230.

The radius scalar $\beta_3$ is defined as:

$$\beta_3 = 1.1/(1/\text{distortion ratio}) \tag{2}$$

$$\text{distortion ratio} = (\text{chin distance}/\text{cheek distance}) \tag{3}$$

Where the variable "chin distance" indicates the length between the philtrum position and the chin position recognized by the face detection and tracking module 120, and the variable "cheek distance" indicates the length between the philtrum position and the left/right cheek position recognized by the face detection and tracking module 120.

Hereinafter, an algorithm utilized in the pixel registration module 132 for face slimmer morphing is described:

For Each Image Pixel i at $P_i(x, y)$
1. Compute the length $d_1$ from $P_i(x, y)$ to the center of $C_1$, $\alpha_1:(x_1, y_1)$
2. Compute the length $d_2$ from $P_i(x, y)$ to the center of $C_2$, where, $C_2=\alpha_1+(\alpha_3*[\cos \beta_1, \sin \beta_1,])*\beta_2$
3. Compute a target coordinate P (x', y') of the pixel value i' to be a reference based on following procedure:
   (1) Decide an initial target coordinate as $P_t=P_i*(1+d_1*\alpha_2)$
   (2) Decide an effect ratio as $$r = \left[ \frac{d_1/\alpha_3}{[d_2/\beta_3]_{0.0}^{1.0}} \right]_{0.0}^{1.0}$$

a control linear blending ratio, which clamps 0.0 to 1.0
   (3) Determine a target coordinate as $P(x', y')=r*(P_t)+(1-r)*(P_i)$
   (4) Adjust a color value at $P_i(x, y)$ according to a color value at the determined target coordinate P(x', y')

The face landmark information, such as a face region, eye positions, nose position, lengths between two positions such as length between philtrum and left cheek/right cheek, is detected by a face detection engine of the face detection and tracking module 120 as described above.

Figure 6:
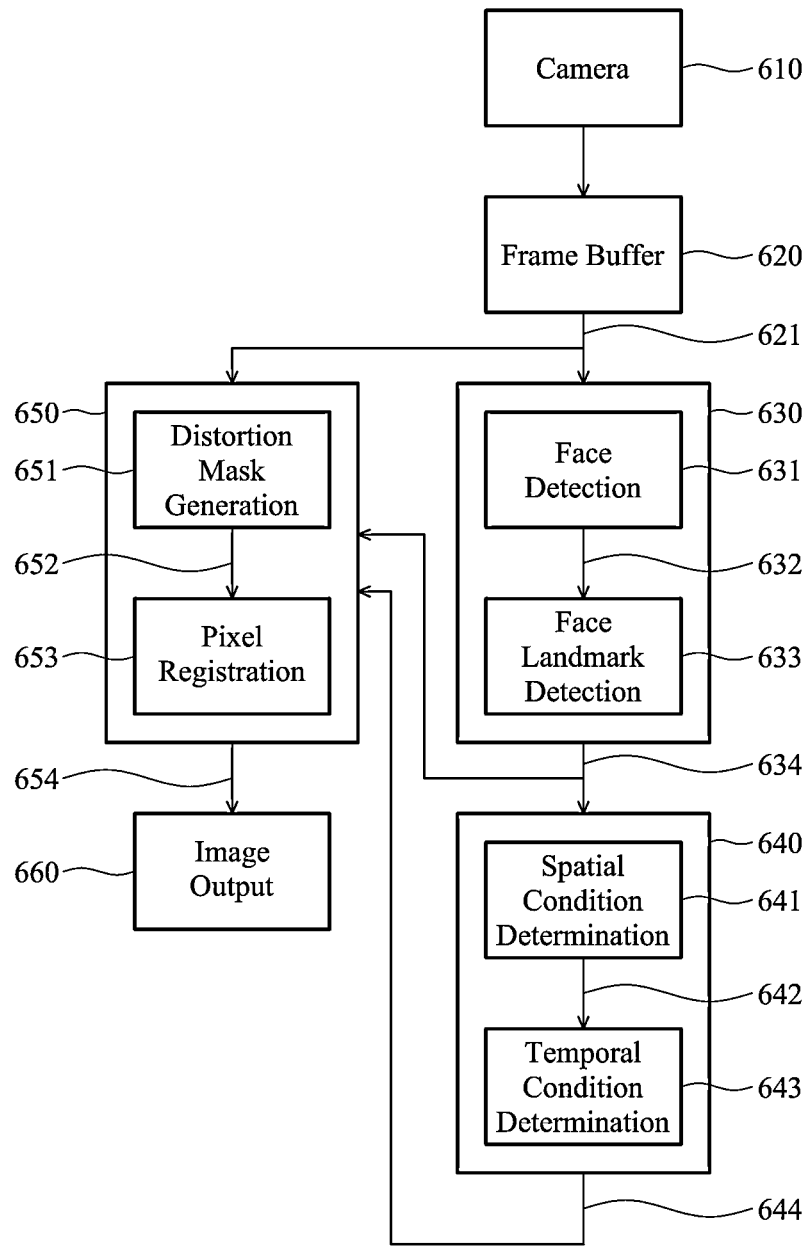
FIG. 6 shows the overall process flow for stabilizing object landmark information.
Figure 7:
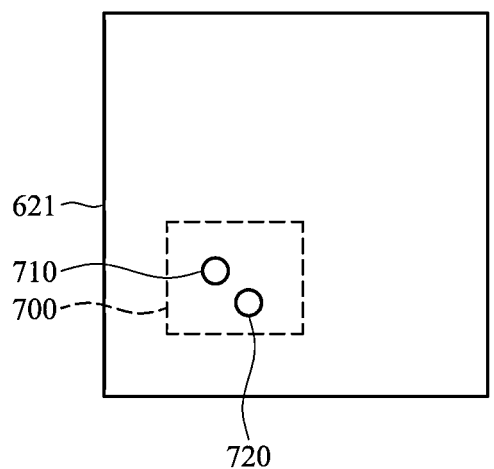
FIG. 7 is a schematic diagram illustrating landmark stabilization determination.

However, face landmark information varies from image to image, and may not be stable enough for the subsequent face-slimming morphing. FIG. 6 shows the overall process flow for stabilizing object landmark information. The face detection and tracking module 630 comprises the face detection module 631 and the face landmark detection module 633. The face detection module 631 determines how many faces are present in an image 621 obtained from the frame buffer 620, which is captured by the camera 610, and outputs the face regions 632 to the face landmark detection module 633. For each detected face region 632, the face landmark detection module 633 detects face landmarks 634 by an object-detection algorithm, such as the AdaBoost algorithm, the rule-based algorithm, or others. The raw landmark information 634 is then passed to the landmark stabilization module 640 to undergo refinement. At the beginning, for example, a detected landmark position in the input image 621 is set as a reference landmark position. And then, (please refer to FIG. 7, which is a schematic diagram illustrating landmark stabilization determination), a certain area around the reference landmark position 710 is set as a stable window 700. If a current landmark position 720 is within the stable window 700, the reference landmark position is set as output landmark position 644 for use by the distortion reduction module 650. As a result, the distortion mask generation module 651 defines the distortion mask according to the reference landmark position. Or, if no landmark information is sent out, the distortion mask generation module 651 reuses the previously defined distortion mask. That is, the distortion mask is the same as the previously used one when the detected face has not moved or moved within a tolerable range. The spatial condition determination module 641 of the landmark stabilization module 640 calculates a successive number of matching results. If the current landmark position is outside the stable window 700, then an unstable count number 642 is increased by one. Otherwise, the unstable count number 642 is set to zero. Then, the unstable count number 642 is output to the temporal condition determination module 643. If the unstable count number 642 of the landmark position is greater than a threshold, the temporal condition determination module 643 resets the reference landmark position to the current landmark position, and sets the current landmark position as the output landmark position 644. As a result, the output landmark information 644 is sent to the distortion reduction module 650 and the distortion mask generation module 651 redefines the distortion mask according to the current landmark position in response to the detected face has moved outside of the tolerable range for a predetermined number of successive images. After that, the pixel registration module 653 adjusts the images 621 within the distortion mask using the aforementioned algorithms and the image output module 660 outputs the adjusted images 654. The image output module 660 may further encode the adjusted images 654 into a video stream for transmitting over a wireless network. The image output module 660 may implement video encoding techniques, such as those described in the standards defined by MPEG-2, MPEG-4, ITU-T H.263, ITU-T H.264, AVC (Advanced Video Coding), HEVC (High Efficiency Video Coding), and extensions of such standards. The wireless network, such as GPRS (General Packet Radio Service), UMTS (Universal Mobile Telecommunications System), CDMA2000, TD-SCDMA (Time Division-Synchronous Code Division Multiple Access), LTE (Long Term Evolution), and extensions of such standards, may carry the video stream to a peer device, such as a remote notebook computer, a remote mobile phone, or others. The above-described modules 610, 620, 630, 640, 650 and 660 may be incorporated in an enclosure to form an electronic device, such as a notebook computer, a mobile phone, or others. The above-described modules 630, 640 and 650 can be implemented in any of numerous ways. For example, they may be implemented using hardware, software or a combination thereof. It should be appreciated that any component or collection of components that perform the functions described above/hereinafter can be generically considered as one or more controllers that control the above/hereinafter discussed function. The controller(s) can be implemented in numerous ways, such as with dedicated hardware, or with general-purpose hardware (e.g., one or more processors) that is programmed using microcode or software to perform the functions recited above/hereinafter. The above-described modules 630, 640 and 650 may be collectively referred to as an image processing module.

Figure 8:
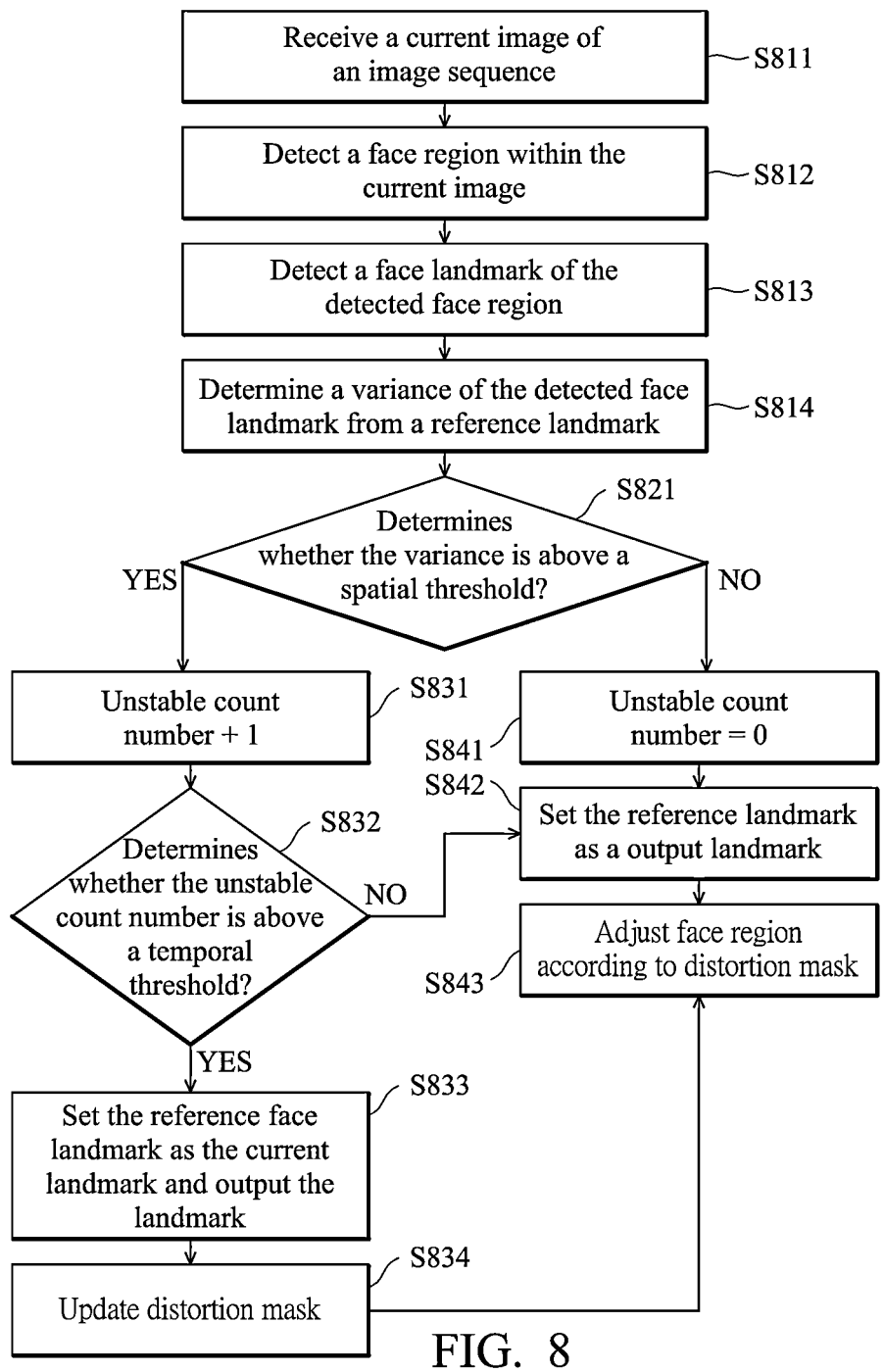
FIG. 8 is a flowchart illustrating a method for adjusting a face region within a distortion mask based on stabilized face landmarks according to an embodiment of the invention.

FIG. 8 is a flowchart illustrating a method for adjusting a face region within a distortion mask based on stabilized face landmarks according to an embodiment of the invention. The process begins to receive a current image of an image sequence from the frame buffer 620 by the face detection module 631 (step S811). The face detection module 631 detects a face region within the current image and output to the face landmark detection module 633 (step S812). The face landmark detection module 633 detects a face landmark of the detected face region and outputs to the spatial condition determination module 641 (step S813). The spatial condition determination module 641 determines the variance of the detected face landmark from a reference landmark (S814) and determines whether the variance is above a spatial threshold (S821). If so, the spatial condition determination module 641 increases the unstable count number by one and outputs to the temporal condition determination module 643 (step S831); otherwise, the process proceeds along the NO branch to step S841, which will be discussed later. The term "face landmark" is defined herein as a collection of one or more values and the term "reference face landmark" is so be defined. The temporal determination module 643 determines whether the unstable count number is above a temporal threshold (step S832). If so, the reference face landmark is set as the current face landmark (step S833), the distortion mask generation module 651 redefines the distortion mask with the new reference landmark (step S834) and the pixel registration module adjusts the face region according to the redefined distortion mask (step S843). Otherwise, the reference face landmark is outputted (step S842) and the pixel registration module adjusts the face region according to the original distortion mask (step S843). Please refer back to step S821. If the variance is not above a spatial threshold, the spatial condition determination module 641 sets the unstable count number to zero (step S841), the reference face landmark is outputted (step S842) and the pixel registration module 653 adjusts the face region according to the original distortion mask (step S843). Those skilled in the art will appreciate that the temporal condition checking as shown in step S832 is provided to avoid unnecessary distortion mask adjustment in the condition that the captured face moves out of a tolerable range in a short time period and then moves back to the original, where the short time period is controlled by the temporal threshold.

Figure 9:
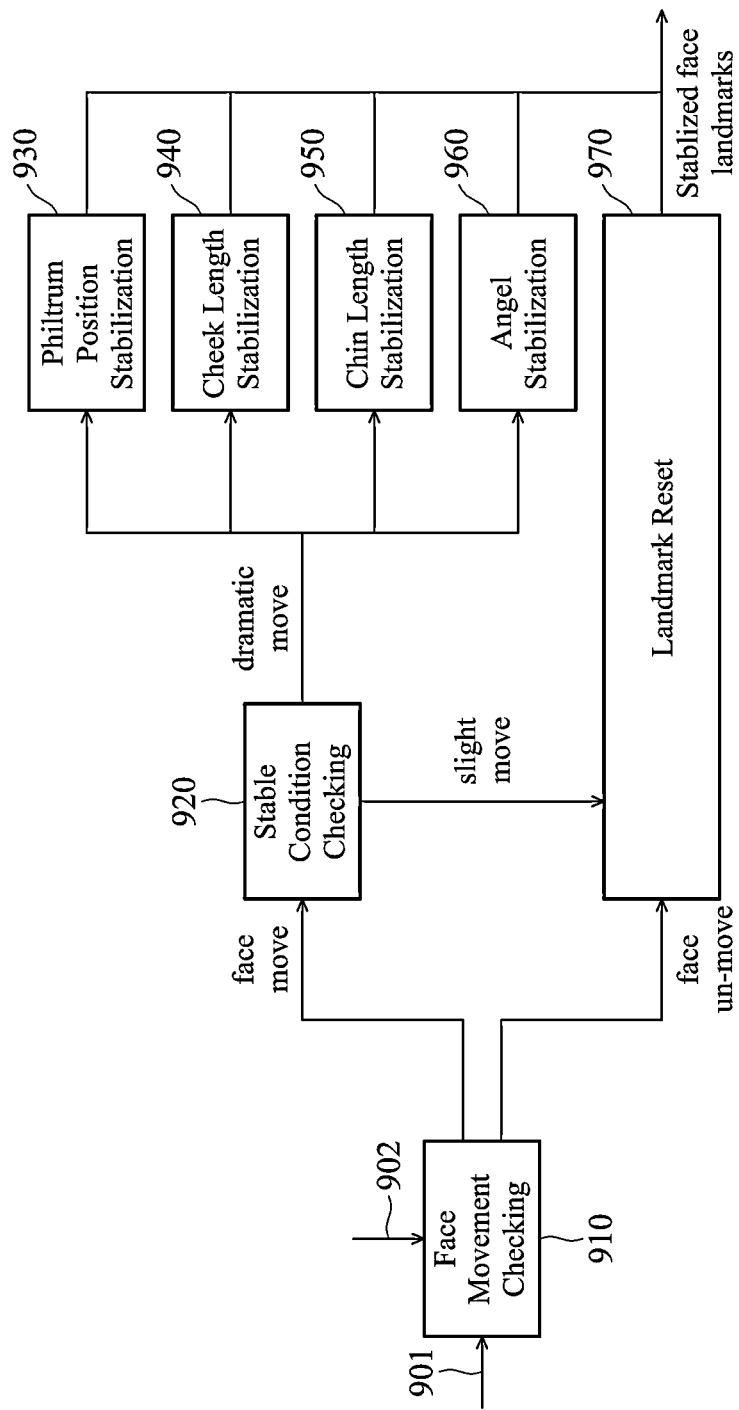
FIG. 9 shows an exemplary process flow for stabilizing face landmark information.
Figure 10:
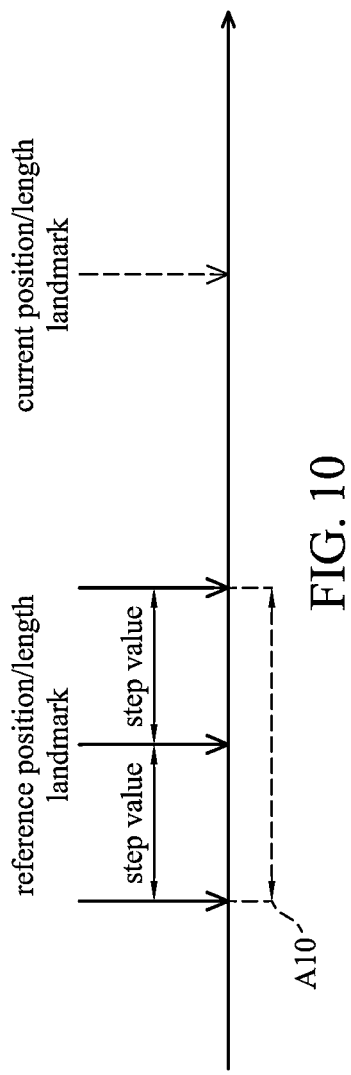
FIG. 10 is a schematic diagram of the spatial condition checking for a position/length landmark.

Stabilization requirements may vary with different object types. FIG. 9 shows an exemplary process flow for stabilizing face landmark information. The first step is performed by the face movement checking module 910 and checks whether a captured face has moved by comparing a reference face landmark 902, which was set according to a previous image, with a current face landmark 901. If so (also referred to as in a condition of face moved), the stabilization process comprising modules 920 to 960 is performed; otherwise (also referred to as in a condition of face un-moved), the reset process comprising the module 970 is performed. In the stabilization process, two stable conditions are determined by the stable condition checking module 920 to enhance the landmark stability for the following refinement. The stable condition checking module 920 first checks the aforementioned spatial condition and then checks the aforementioned temporal condition. FIG. 10 is a schematic diagram of the spatial condition checking for a position/length landmark, such as a philtrum position, a cheek length, a chin length, or any combination thereof. A window A10 is set based on the reference position/length landmark 902, which was set in a previous image, and a predefined step value. If the current position/length landmark 901 falls within the window A10 (also referred to as in a condition of slight move), the reference position/length landmark 902 is maintained and the unstable count number is set to zero. In the reset process, the landmark reset module 970 outputs the reference position/length landmark 902. Otherwise, the unstable count number is increased by one, and in response to the unstable count number is greater than a threshold (also referred to as in a condition of dramatic move), the reference position/length landmark 902 is set based on the current position/length landmark 901. For example, the reference philtrum position may be set to the current philtrum position and/or a predefined step value by the philtrum position stabilization module 930. The cheek length stabilization module 940 and the chin length stabilization module 950 may perform similar calculations to adjust reference cheek length and reference chin length, respectively.

Figure 11:
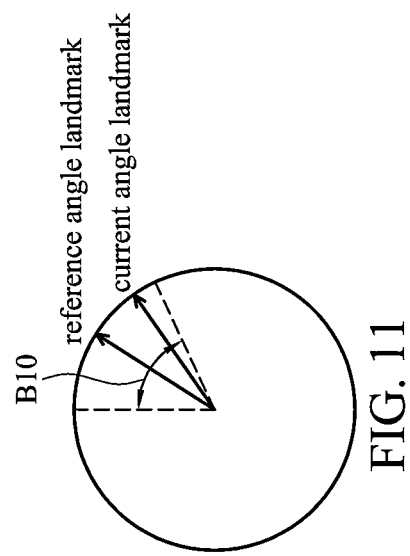
FIG. 11 is a schematic diagram of the spatial condition checking for an angle landmark.

FIG. 11 is a schematic diagram of the spatial condition checking for an angle landmark, such as a yaw, pitch or roll angle (which can be referred to as 260 of FIG. 2). A window B10 is set based on the reference angle landmark 902, which was set in a previous image, and a predefined step value. If the current angle landmark 901 falls within the window B10 (also referred to as in a condition of slight move), the reference angle landmark 902 is maintained and the unstable count number is set to zero. In the reset process, the landmark reset module 970 outputs the reference angle landmark 902. Otherwise, the unstable count number is increased by one, and in response to the unstable count number is greater than a threshold (also referred to as in a condition of dramatic move), the reference angle landmark 902 is set based on current angle landmark 901. For example, the reference angle landmark 902 may be set to the current angle landmark and/or a predefined step value by the angle stabilization module 960.

To implement the above-described face image processing, such as face slimmer, and the associated algorithms, such as distortion mask generation, face brightening and redder, etc., the computation load might be too heavy. The load may be shared between a CPU (central processing unit) and a GPU (graphics processing unit), and the CPU and the GPU utilize streaming texture technology to communicate with each other. An embodiment of the invention discloses the multi-processor hybrid architecture for handling the aforementioned computations. The GPU or CPU may contain a large number of ALUs (arithmetic logic units) or 'Cores' processing units. These processing units are capable of being used for massive parallel processing.

Figure 12:
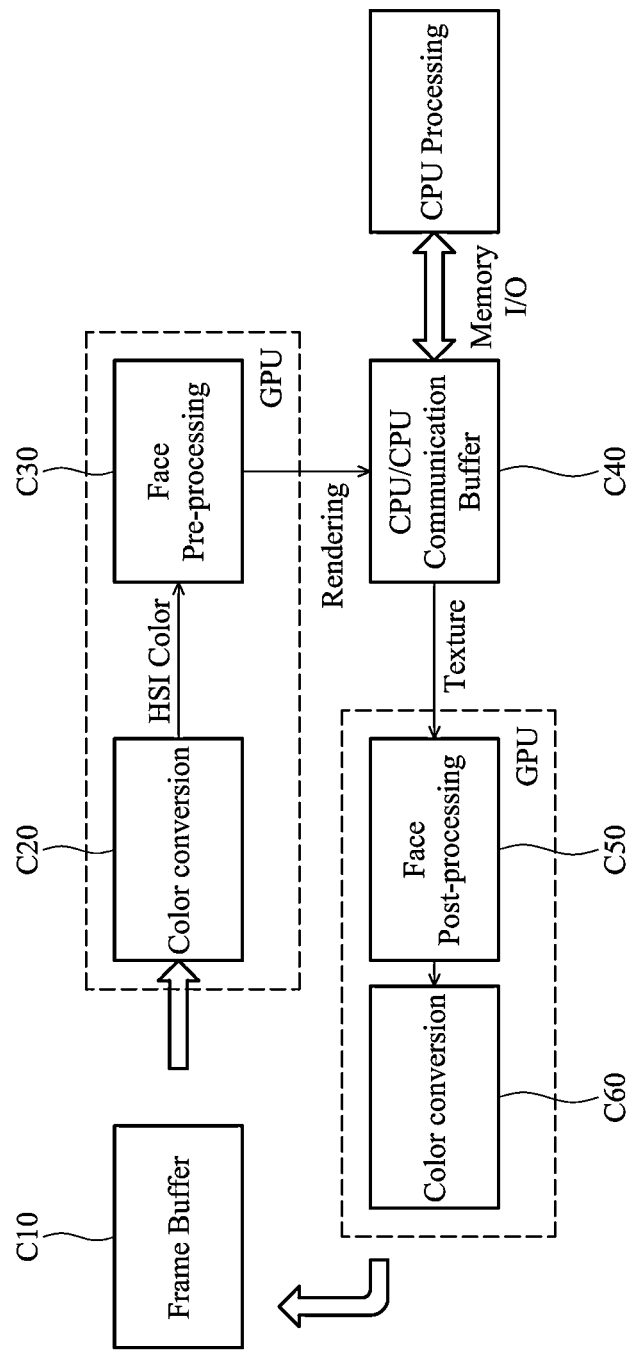
FIG. 12 illustrates the architecture for the hybrid GPU/CPU process model according to an embodiment of the invention.

FIG. 12 illustrates the architecture for the hybrid GPU/CPU process model according to an embodiment of the invention. The frame buffer C10 holds source images, each containing at least one face. The color format of the source images may vary based on the use case and software/hardware platform, for example, yuv420sp are commonly applied for camera shooting and video recording, where RGB565 are commonly applied for UI (user interface) and still-image decoding. To unify the color format for processing, the system utilizes the GPU to perform the color conversion C20 to convert the color format of the source images into another. Due to the nature of the HSI (hue, saturation and intensity) color format being suitable for face processing algorithms, the source images are converted to HSI color format.

After the color conversion, each source image is sent to the face pre-processing module C30 of the GPU. Two main processes are performed in the module C30: the distortion mask generation and the face color processing (brightening and reddening). Due to the GPU being designed with parallel pixel manipulation, it gains better performance to perform the two processes by the GPU than by the CPU. The face pre-processing module C30 renders the results into the GPU/CPU communication buffer C40. Since the GPU/CPU communication buffer C40 is preserved in a RAM (random access memory) for streaming textures, data stored in the GPU/CPU communication buffer C40 can be accessed by both the GPU and CPU. The GPU/CPU communication buffer C40 may store four channel images, in which each pixel is represented by 32 bits. The first three channels are used to store HSI data and the fourth channel is used to store the aforementioned distortion mask information, wherein the distortion mask is defined by algorithms performed by the CPU or GPU. The distortion mask can been seen in 410 of FIG. 4, the fourth channel for each pixel may store a value to indicate if the pixel falls within the distortion mask or not.

The data of the GPU/CPU communication buffer C40 is sent to the CPU, and is rendered by the face pre-processing module C30 of the GPU. Since the CPU has a higher memory I/O access rate on RAM and faster computation capability than that of the GPU, the CPU may perform certain pixel computation tasks, such as face smoothing, anti-shining, or others, more efficiently. Finally, after the CPU completes the tasks, the data of the GPU/CPU communication buffer C40 will be sent back to the face post-processing module C50 of the GPU for post-processing, such as face slimming, or others, and the color conversion module C60 of the GPU converts the color format, such as the HSI color format, into the original color format that the source images use, and then renders the adjusted images to the frame buffer C10. The described CPU/GPU hybrid architecture provides better performance and less CPU usage. It is measured that the overall computation performances for reducing or eliminating perspective distortion can be enhanced by at least 4 times over the sole use of the CPU.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A face-slimming method applied to a series of images captured by an electronic device, comprising:
   receiving a current image;
   detecting at least a face landmark corresponding to a face region of the current image;
   comparing the face landmark of the current image with a reference landmark;
   adjusting a distortion mask according to the comparison result; and
   adjusting a size of the face region within the current image according to the distortion mask, wherein the distortion mask corresponds to a position of the face landmark,
   wherein the comparing of the face landmark comprises:
   determining whether the position of the face landmark falls within a stable window; and
   increasing an unstable count number in response to the position of the face landmark falling outside of the stable window, where the stable window is defined according to the position of the reference landmark,
   wherein the comparing of the face landmark further comprises:
   determining whether the unstable count number exceeds a predetermined threshold; and
   updating the reference landmark with the face landmark of the current image in response to the unstable count number exceeding the predetermined threshold.

2. The face-slimming method of claim 1, wherein the face landmark comprises a combination of a philtrum parameter, a cheek parameter, a chin parameter, and a face angle parameter.

3. The face-slimming method of claim 1, wherein the adjustment of the distortion mask further comprises adjusting positions of the face landmark within the distortion mask.

4. The face-slimming method of claim 1, wherein the receiving of the current image further comprises:
   initiating a real-time video communication application; and
   capturing the series of images including the current image by a camera module of the electronic device.

5. An electronic device, comprising:
   a camera module, configured to capture a series of images, the series of images comprising a face of a user;
   an image processing module, configured to receive the series of images and, for each incoming current image, determine at least one face landmark of a face region within the current image, compare the face landmark with a reference landmark and adjust a size of the face region according to the comparison result; and
   an image output module, configured to transmit the series of the adjusted images,
   wherein the image processing module comprises:
   a spatial condition determination module, configured to determine whether the face landmark of the current image falls within a stable window, and increase an unstable count number in response to the face landmark falling outside of the stable window, the stable window being defined according to the reference landmark; and
   a temporal condition determination module, configured to determine whether the unstable count number exceeds a predetermined threshold,
   wherein the spatial condition determination unit is further configured to update the reference landmark in response to the unstable count number exceeding the predetermined threshold.

6. The electronic device of claim 5, wherein the image processing module comprises:
   a face detection module, configured to detect the face region within the series of images; and
   a face landmark detection module, configured to determine a position of the face landmark of the face region.

7. The electronic device of claim 5, wherein the image processing module comprises:
   a distortion mask generation module, configured to adjust a distortion mask corresponding to the face region according to the comparison result; and
   a pixel registration module, configured to adjust the size of the face region in the current image according to the distortion mask;
   wherein the distortion mask corresponds to positions of the face landmark.

8. The electronic device of claim 5, wherein the face landmark comprises a combination of a philtrum parameter, a cheek parameter, a chin parameter and a face angle parameter.

9. The electronic device of claim 5, wherein the image output module is further configured encode the series of images into a video stream to be transmitted over a wireless network.

10. An image processing method for use in an electronic device, comprising:
    capturing a series of images;
    detecting a face region of a user from each of the images;
    defining a distortion mask corresponding to the face region;
    adjusting a size of the face region of each image within the distortion mask; and
    encoding the adjusted images into a video stream,
    wherein the step of defining the distortion mask further comprises:
    detecting a face landmark for each image;
    determining whether the detected face landmarks have successively moved beyond a tolerable range from a reference landmark by a predetermined number of images;
    in response to the detected face landmark moved beyond the tolerable range, defining the distortion mask according to the detected face landmark; and
    in response to the detected face landmark not moved beyond the tolerable range, defining the distortion mask according to the reference landmark,
    wherein the determining step further comprises:
    for each image, increasing an unstable count number in response to the detected face landmark falls outside of a stable window around the reference landmark; and
    determining that the detected face landmarks have successively moved beyond the tolerable range from the reference landmark by the predetermined number of images and updating the reference landmark in response to the unstable count number exceeds a predetermined threshold.

11. The image processing method of claim 10, wherein the distortion mask covers a face area below a philtrum position and a left cheek position and a right cheek position.

12. The image processing method of claim 10, wherein the adjustment of the face region for each image further comprises:
   determining a target pixel for each pixel within the distortion mask, wherein the target pixel is with a longer distance from the center of the distortion mask than that with the pixel; and
   adjusting a color value of the pixel according to a color value of the target pixel.

13. The image processing method of claim 10, wherein the adjusted image has a smaller size of the face region than the original image.

* * * * *